United States Patent [19]
Khanarian et al.

[11] Patent Number: 6,140,422
[45] Date of Patent: Oct. 31, 2000

[54] POLYESTERS INCLUDING ISOSORBIDE AS A COMONOMER BLENDED WITH OTHER THERMOPLASTIC POLYMERS

[75] Inventors: Garo Khanarian, Berkeley Heights; Larry F. Charbonneau, Mendham, both of N.J.; Helmut B. Witteler, Beindersheim, Germany

[73] Assignee: E.I. DuPont de Nemours and Company, Wilmington, Del.

[21] Appl. No.: 09/064,826

[22] Filed: Apr. 23, 1998

[51] Int. Cl.$^7$ .................................................. C08L 67/02
[52] U.S. Cl. ..................... 525/176; 525/165; 525/177; 525/437; 525/439; 525/440; 525/444; 528/298; 528/300
[58] Field of Search ..................................... 525/165, 176, 525/177, 437, 439, 440, 444; 578/298, 300

[56] References Cited

U.S. PATENT DOCUMENTS

| | | |
|---|---|---|
| 2,985,995 | 5/1961 | Bunting, Jr. et al. . |
| 3,199,281 | 8/1965 | Maerov et al. . |
| 3,684,766 | 8/1972 | Jackson, Jr. et al. . |
| 3,785,993 | 1/1974 | Langhans . |
| 3,795,627 | 3/1974 | Langhans et al. . |
| 3,859,445 | 1/1975 | Langhans . |
| 3,871,947 | 3/1975 | Brekken . |
| 3,966,867 | 6/1976 | Munting . |
| 4,146,663 | 3/1979 | Ikeda et al. . |
| 4,157,419 | 6/1979 | Mirhej . |
| 4,159,617 | 7/1979 | Allan . |
| 4,195,161 | 3/1980 | Davis et al. . |
| 4,209,559 | 6/1980 | Wada et al. . |
| 4,223,128 | 9/1980 | Halek et al. . |
| 4,225,549 | 9/1980 | Allan . |
| 4,231,922 | 11/1980 | Robeson . |
| 4,246,381 | 1/1981 | Robeson . |
| 4,255,301 | 3/1981 | Minagawa et al. . |
| 4,259,458 | 3/1981 | Robeson . |
| 4,259,478 | 3/1981 | Jackson, Jr. et al. . |
| 4,294,956 | 10/1981 | Berger et al. . |
| 4,294,957 | 10/1981 | Berger et al. . |
| 4,351,917 | 9/1982 | Calundann et al. . |
| 4,352,927 | 10/1982 | Cogswell et al. . |
| 4,355,080 | 10/1982 | Zannucci . |
| 4,374,239 | 2/1983 | Berger et al. . |
| 4,383,051 | 5/1983 | Meyborg et al. . |
| 4,383,923 | 5/1983 | Elfert . |
| 4,386,186 | 5/1983 | Maresca et al. . |
| 4,408,061 | 10/1983 | Salzburg et al. . |
| 4,413,116 | 11/1983 | Reuter et al. . |
| 4,418,174 | 11/1983 | Dhien et al. . |
| 4,435,562 | 3/1984 | Sullivan et al. . |
| 4,438,226 | 3/1984 | Dirlikov et al. . |
| 4,439,586 | 3/1984 | Kawakami et al. . |
| 4,443,563 | 4/1984 | Dirlikov et al. . |
| 4,456,729 | 6/1984 | Dhein et al. . |
| 4,474,918 | 10/1984 | Seymour et al. . |
| 4,506,066 | 3/1985 | Medem et al. . |
| 4,506,086 | 3/1985 | Salzburg et al. . |
| 4,526,923 | 7/1985 | Hornbaker et al. . |
| 4,551,520 | 11/1985 | Morris et al. . |
| 4,557,982 | 12/1985 | Nouda et al. . |
| 4,564,645 | 1/1986 | Salzburg et al. . |
| 4,587,071 | 5/1986 | Minami et al. . |
| 4,605,729 | 8/1986 | Barnes et al. . |
| 4,663,415 | 5/1987 | Grögler et al. . |
| 4,687,830 | 8/1987 | Weber et al. . |
| 4,713,436 | 12/1987 | Downs et al. . |
| 4,725,647 | 2/1988 | Maresca et al. . |
| 4,805,788 | 2/1989 | Akiho . |
| 4,814,426 | 3/1989 | Utsumi et al. . |
| 4,863,046 | 9/1989 | Collette et al. . |
| 4,993,566 | 2/1991 | Eberle . |
| 4,993,567 | 2/1991 | Eberle, Jr. . |
| 5,005,716 | 4/1991 | Eberle . |
| 5,021,289 | 6/1991 | Light et al. . |
| 5,108,675 | 4/1992 | Matsuo et al. . |
| 5,120,822 | 6/1992 | Hoeschele et al. . |
| 5,124,388 | 6/1992 | Pruett et al. . |
| 5,141,120 | 8/1992 | Brown et al. . |
| 5,141,121 | 8/1992 | Brown et al. . |
| 5,153,302 | 10/1992 | Masuda et al. . |
| 5,164,478 | 11/1992 | Lee et al. . |
| 5,179,143 | 1/1993 | König et al. . |

(List continued on next page.)

FOREIGN PATENT DOCUMENTS

| | | |
|---|---|---|
| 0033089A2 | 8/1981 | European Pat. Off. . |
| 0102596A2 | 3/1984 | European Pat. Off. . |
| 1263981 | 3/1968 | Germany . |
| 3229412 A1 | 2/1984 | Germany . |
| 4415353A1 | 11/1994 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 52018832A | 7/1975 | Japan . |
| 1079686 | 8/1967 | United Kingdom . |
| 1354446 | 5/1974 | United Kingdom . |
| 1408036 | 10/1975 | United Kingdom . |
| 96/38282 | 12/1996 | WIPO . |
| 96/38498 | 12/1996 | WIPO . |
| 97/00284 | 1/1997 | WIPO . |

OTHER PUBLICATIONS

Chemical Abstracts vol. 62, col. 10588, Neth. App. 6,405, 497 (1965).

*Encyclopaedic Dictionary of Commercial Polymer Blends*, Ed. L.A. Utracki, ChemTec Publishing, pp. 10–11, 23, 35–43 (1994).

"Plastics processing," *McGraw–Hill Encyclopedia of Science & Technology*, 6$^{th}$ Edition, pp. 35–40 (1987).

(List continued on next page.)

*Primary Examiner*—Patricia A. Short
*Attorney, Agent, or Firm*—Burns, Doane, Swecker & Mathis, LLP

[57] ABSTRACT

A polymer blend including a polyester and another thermoplastic polymer. The polyester includes terephthaloyl moieties and, optionally, other aromatic diacid moieties; and ethylene glycol moieties; optionally diethylene glycol moieties; isosorbide moieties; and, optionally one or more other diol moieties. The polyester has an inherent viscosity of at least about 0.35 dL/g.

12 Claims, No Drawings

U.S. PATENT DOCUMENTS

| | | |
|---|---|---|
| 5,296,550 | 3/1994 | Natarajan et al. . |
| 5,321,056 | 6/1994 | Carson et al. . |
| 5,382,474 | 1/1995 | Adhya et al. . |
| 5,409,967 | 4/1995 | Carson et al. . |
| 5,412,005 | 5/1995 | Bastioli et al. . |
| 5,484,632 | 1/1996 | Mercer, Jr. et al. . |
| 5,496,887 | 3/1996 | Braune . |
| 5,596,888 | 1/1997 | McLarty, III et al. . |
| 5,607,757 | 3/1997 | Dalton . |
| 5,616,404 | 4/1997 | Sublett . |
| 5,646,236 | 7/1997 | Schafheutle et al. . |
| 5,648,152 | 7/1997 | Diaz-Kotti et al. . |
| 5,654,083 | 8/1997 | Venema . |
| 5,656,719 | 8/1997 | Stibal et al. . |
| 5,709,929 | 1/1998 | Venema . |
| 5,721,397 | 2/1998 | Weinberg . |
| 5,747,175 | 5/1998 | Dietz et al. . |
| 5,766,679 | 6/1998 | Siemensmeyer et al. . |

OTHER PUBLICATIONS

"Plastics Processing," *The Way Things Work*, vol. 2, pp. 56–59 (1971).

*Polymer Alloys and Blends:Thermodynamics and Rheology*, Ed. L.A. Utracki, Hanser Publishers, pp. 256–270, 275–280, 287–293, 297–299 (1990).

*Polymeric Materials Encyclopedia*, "Polyesters (Derived from Renewable Sources)", vol. 8, pp. 5891–5896, CPC Press, Inc. (1996).

Dietrich Braun and Matthias Bergmann "1,4:3,6–Dianhydrohexite als Bausteine Für Polymere" J. prakt. Chem. 334, p. 298–310 (1992).

Hans R. Kricheldorf, "'Sugar Diols' as Building Blocks of Polycondensates," J.M.S.—Rev. Macromol. Chem. Phys., C37(4), pp. 599–631 (1997).

Reinhard Storbeck, Matthias Rehahn and Matthias Ballauff, "Synthesis and properties of high–molecular–weight polyesters based on 1,4:3,6–dianhydrohexitols and terephthalic acid," Makromol. Chem. 194, pp. 53–64 (1993).

Reinhard Storbeck, "Synthese und Charakterisierung von Polyestern auf Basis nachwachsender Rohstoffe," Dissertation, Universität Karlsruhe, 1994.

Reinhard Storbeck and Matthias Ballauff, "Synthesis and Thermal Analysis of Copolyesters Deriving from 1,4:3,6–Dianhydrosorbitol, Ethylene Glycol, and Terephthalic Acid," Journal of Applied Polymer Science, vol. 59, pp. 1199–1202 (1996).

D. Braun et al., "Polyesters with 1.4:3.6–dianhydrosorbitol as polymeric plasticizers for PVC," Die Angewandte Makromolekulare Chemie 199, pp. 191–205 (1992).

D. Braun et al., "Grafting of polyesters by free–radical chain transfer," Die Angewandte Makromolekulare Chemie 210, pp. 173–196 (1993).

Estelle Cognet–Georjon et al., "New polyurethanes based on diphenylmethane diisocyanate and 1,4:3,6–dianhydrosorbitol, 1," Macromol. Chem. Phys. 196, pp. 3733–3751 (1995).

Estelle Cognet–Georjon et al., "New polyurethanes based in 4,4'–diphenylmethane diisocynate and 1,4:3,6 dianhydrosorbitol, $2^{a)}$" Macromol. Chem. Phys. 197, pp. 3593–3612 (1996).

Hans R. Kricheldorf et al., "Chiral thermotropic copoly(ester–imide)s based on isosorbide$^{b)}$ and N–(4–carboxyphenyl)trimellitimide," Macromol. Rapid Commun. 16, pp. 231–237 (1995).

Hans R. Kricheldorf et al., "New Polymer Syntheses. LXXXII. Synthesis of Poly(ether–sulfone)s from Silylated Aliphatic Diols Including Chiral Monomers," Journal of Polymer Science: Part A: Polymer Chemistry, vol. 33, pp. 2667–2671 (1995).

Hans R. Kricheldorf et al., "LC–polyimides 26. Photoreactive, nematic or cholesteric poly(ester–imide)s derived from 4–aminocinnamic acid trimellitimide, isosorbide and various diphenols," High Perform. Polym., 7, pp. 471–480 (1995).

Hans R. Kricheldorf et al., "Cholesteric and photoreactive polyesters," Reactive & Functional Polymers, 30, pp. 173–189 (1996).

Masahiko Okada et al., "Synthesis and biodegradability of polyesters based on 1,4:3,6–dianhydrohexitols and sucinic acid derivatives" in *Biodegradable Plastics and Polymers*, Eds. Y. Doi and K. Fukada, Elsevier Science B.V., pp. 511–518 (1994).

Masahiko Okada et al., "Synthesis and Degradabilities of Polyesters from 1,4:3,6–Dianhydrohexitols and Aliphatic Dicarboxylic Acids," Journal of Polymer Science: Part A: Polymer Chemistry, vol. 33, pp. 2813–2820 (1995).

Masahiko Okada et al., "Biodegradable Polymers Based on Renewable Resources: Polyesters Composed of 1,4:3,6–Dianhydrohexitol and Aliphatic Dicarboxylic Acid Units," Journal of Applied Polymer Science, vol. 62, pp. 2257–2265 (1996).

Martin Reinecke and Helmut Ritter, "Branching and crosslinking of an unsaturated oligoester with furfurylamides and sorbic acid amides via Diels–Alder additions," Makromol. Chem. 194 pp. 2385–2393 (1993).

Joachim Thiem et al., "Synthesis of Polyterephthalates Derived from Dianhydrohexitols," Polymer Bulletin 11, pp. 365–369 (1984).

Sirinat Wilbullucksanakul et al., "Synthesis of polyurethanes from saccharide–derived diols and diisocyantes and their hydrolyzability," Macromol. Chem., Phys. 197, pp. 135–146 (1996).

V.L. Lapenkov et al., "Polyvinyl ethers of dianhydro derivatives of mannitol and sorbitol," Ref. Zh., Khim. 1973, Abstr. No. 15S298.

Stanislaw Ropuszynski et al., "Preparation of oxyethylene derivatives of esters of dianhydroglucitol and some higher fatty acids and study of their properties," Abstract; Pr. Nauk. Inst. Technol. Org. Tworzyw Sztucznych Politech. Wroclaw., No. 3, pp. 15–38 (1971) with Abstract.

Mustapha Majdoub et al., Nouveaux Polyéthers Et Polyesters Á Base D'Isosorbide: Synthèse Et Caractérisation, Eur. Polym. J., vol. 30, No. 12, pp. 1431–1437 (1994) (abstract).

J. Thiem et al., "Darstellung und gezielte Polykondensation von Anhydroalditol–Bausteinen aus Stärke", starch/stärke, 36, Nr.5, pp. 170–176 (1984) (abstract).

POLYESTERS INCLUDING ISOSORBIDE AS A COMONOMER BLENDED WITH OTHER THERMOPLASTIC POLYMERS

RELATED APPLICATIONS

The following copending applications, filed on even date herewith, all contain related subject matter: U.S. application Ser. Nos: 09/086,064; 09/064,846; 09/064,719 and 09/064,720. The following issued patents, the applications thereof having been filed on even date herewith, also contain related subject matter: U.S. Pat. No. 5,959,066 issued Sep. 28, 1999; U.S. Pat. No. 5,958,581 issued Sep. 28, 1999; and U.S. Pat. No. 6,025,061, issued Feb. 15, 2000. The contents of each of the above-identified applications and patents is hereby incorporated by reference.

FIELD OF THE DISCLOSURE

This disclosure relates to polyester blends and methods of making polyester blends, and more specifically to polyesters containing an isosorbide moiety, blended with other thermoplastic polymers, and methods of making them.

BACKGROUND OF THE DISCLOSURE

The diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

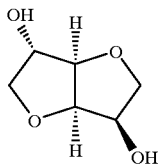

Isosorbide has been incorporated as a monomer into polyesters that also include terephthaloyl moieties. See, for example, R. Storbeck et al, *Makromol.Chem.*, Vol.194, pp. 53–64 (1993); R. Storbeck et al, *Polymer*, Vol. 34, p. 5003 (1993). However, it is generally believed that secondary alcohols such as isosorbide have poor reactivity and are sensitive to acid-catalyzed reactions. See, for example, D. Braun et al., *J. Prakt.Chem.*, Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above but still relatively low when compared against other polyester polymers and copolymers. Further, these polymers were made by solution polymerization and were thus free of diethylene glycol moieties as a product of polymerization. See R. Storbeck, Dissertation, Universitat Karlsruhe (1994); R. Storbeck, et al., *J. Appl. Polymer Science*, Vol. 59, pp. 1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e., 400 to 10,000, and no polyester actually containing the 1,4:3,6-dianhydrosorbitol moiety was made.

Published PCT Applications WO 97/14739 and WO 96/25449 describe cholesteric and nematic liquid crystalline polyesters that include isosorbide moieties as monomer units. Such polyesters have relatively low molecular weights and are not isotropic.

Currently, high molecular weight polyesters containing an isosorbide moiety have not been blended with other thermoplastic polymers.

SUMMARY OF THE DISCLOSURE

Contrary to the teachings and expectations that have been published in the prior art, isotropic, i.e., semi-crystalline and amorphous or non liquid crystalline, copolyesters containing terephthaloyl moieties, ethylene glycol moieties, isosorbide moieties and, optionally, diethylene glycol moieties are readily synthesized in molecular weights that are suitable for making fabricated products, such as films, beverage bottles, molded products, sheets and fibers on an industrial scale.

The polymers used, depend on the polymer composition that is desired. The amount of each polymer is desirably chosen so that the final polymeric product possesses the desired property.

The polyester desirably contains terephthaloyl moieties, ethylene glycol moieties, isosorbide moieties and, optionally, diethylene glycol moieties arranged to provide a useful high molecular weight polymer which may be blended with one or more of the thermoplastic polymers.

In a preferred embodiment, the number of terephthaloyl moieties in the polyester polymer is in the range of about 25% to about 50 mole % (mole % of the total polymer). The polyester polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 25 mole % (mole % of the total polymer).

In a preferred embodiment, ethylene glycol monomer units are present in the polyester polymer in amounts of about 5 mole % to about 49.75 mole %. The polyester polymer may also contain diethylene glycol moieties. Depending on the method of manufacture, the amount of diethylene glycol moieties in the polyester polymer is in the range of about 0.0 mole % to about 25 mole %.

In a preferred embodiment, isosorbide is present in the polyester polymer in amounts in the range of about 0.25 mole % to about 40 mole %. One or more other diol monomer units may also be included in the polyester polymer in amounts up to a total of about 45 mole %.

Of course, all of the percentages are dependent on the particular application desired. Desirably, however, equimolar amounts of diacid monomer units and diol monomer units are present in the polyester polymer. This balance is desirable to achieve a high molecular weight polyester polymer.

The polyester polymer has an inherent viscosity, which is an indicator of molecular weight, of at least about 0.35 dL/g, as measured on a 1% (weight/volume) solution of the polymer in o-chlorophenol at a temperature of 25° C. This inherent viscosity is sufficient for some applications, such as some optical articles and coatings. For other applications, such as compact discs, an inherent viscosity of about 0.4 dL/g is preferred. Higher inherent viscosities, such as at least about 0.5 dL/g are needed for many other applications (e.g. bottles, films, sheet, molding resin). Further processing of the polyester polymer may achieve even higher inherent viscosities.

The polyester polymer is blended with one or more other thermoplastic polymers. The other thermoplastic polymers suitable for use in the blends of the present invention include polycarbonates; styrene resins; alkyl acrylate resins; polyurethanes; vinyl chloride polymers; polyarylethers; copolyetherester block polymers; polyhydroxyethers; polyarylates; other polyesters or mixtures thereof.

The ratio of polyester polymer to other thermoplastic polymer may vary widely depending on the desired properties.

DETAILED DESCRIPTION OF THE PREFERRED EMBODIMENTS OF THE DISCLOSURE

The blends of the present invention are described below in terms of the polyesters and other thermoplastic polymers that may be included within the blends.

Polyester Polymers Containing Isosorbide Moieties

The polyester polymer, described in detail below, may be made by the melt condensation of a combination of monomers containing an ethylene glycol moiety, an isosorbide moiety and a terephthaloyl moiety. Small amounts of other monomers may be added during the polymerization or may be produced as by-products during the reaction.

In a preferred embodiment, ethylene glycol monomer units are present in amounts of about 5 mole % to about 49.75 mole %, preferably 10 mole % to about 49.5 mole %, more preferably about 25 mole % to about 48 mole %, and even more preferably about 25 mole % to about 40 mole %. The polyester polymer may also contain diethylene glycol monomer units. Depending on the method of manufacture, the amount of diethylene glycol monomer units is in the range of about 0.0 mole % to about 25 mole %, preferably 0.25 mole % to about 10 mole %, and more preferably 0.25 mole % to about 5 mole %. Diethylene glycol may be produced as a by-product of the polymerization process, and may also be added to help accurately regulate the amount of diethylene glycol monomer units that are in the polyester polymer.

In a preferred embodiment, isosorbide moieties are present in the polyester polymer in amounts in the range of about 0.25 mole % to about 40 mole %, preferably about 0.25 mole % to about 30 mole %, and more preferably about 0.5 mole % to 20 mole %. Depending on the application, isosorbide may be present in any desirable range such as 1 mole % to 3 mole %, 1 mole % to 6 mole %,1 mole % to 8 mole % and 1 mole % to 20 mole %. One or more other diol monomer units may optionally be included in amounts up to a total of about 45 mole %, preferably less than 20 mole %, and even more preferably less than 15 mole %, even more preferably less than 10 mole % and even more preferably less than 2 mole %. Examples of these optional other diol units include aliphatic alkylene glycols having from 3–12 carbon atoms and having the empirical formula $HO-C_nH_{2n}-OH$, where n is an integer from 3–12, including branched diols such as 2,2-dimethyl-1,3-propanediol; cis or trans-1,4-cyclohexanedimethanol and mixtures of the cis and trans isomers; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxyethoxy)-phenyl]fluorene; 1,4:3,6-dianhydromannitol; 1,4:3,6-dianhydroiditol; and 1,4-anhydroerythritol.

In a preferred embodiment, the number of terephthaloyl moieties in the polyester polymer is in the range of about 25 mole % to about 50 mole % more preferably about 40 mole % to about 50 mole %, even more preferably about 45 mole % to about 50 mole % (mole % of the total polymer). The polyester polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 25 mole %, preferably up to 10 mole %, more preferably up to about 5 mole % (mole % of the total polymer).

Of course, all of the percentages are dependent on the particular application desired. Desirably, however, equimolar amounts of diacid monomer units and diol monomer units are present in the polyester polymer. This balance is desirable to achieve a high molecular weight.

The polyester polymer has an inherent viscosity, which is an indicator of molecular weight, of at least about 0.35 dL/g, as measured on a 1% (weight/volume) solution of the polymer in o-chlorophenol at a temperature of 25° C. This inherent viscosity is sufficient for some applications, such as some optical articles and coatings. For other applications, such as compact discs, an inherent viscosity of about 0.4 dL/g is preferred. Higher inherent viscosities are needed for many other applications (e.g. bottles, films, sheet, molding resin). The conditions can be adjusted to obtain desired inherent viscosities up to at least about 0.5 and desirably higher than 0.65 dL/g. Further processing of the polyester may achieve inherent viscosities of 0.7, 0.8, 0.9, 1.0, 1.5, 2.0 dL/g and even higher.

The molecular weight is normally not measured directly. Instead, the inherent viscosity of the polymer in solution or the melt viscosity is used as an indicator of molecular weight. For the present polyester polymers, the inherent viscosity is measured by the method described previously, with a molecular weight corresponding to an inherent viscosity of about 0.35 or more being sufficient for some uses. Higher molecular weights, corresponding to inherent viscosities of about 0.45 or more, may be required for other applications. Generally, the inherent viscosity/ molecular weight relationship can be fitted to a linear equation:

$$\log(I.V.)=0.5856\times\log(Mw)-2.9672.$$

The inherent viscosities are a better indicator of molecular weight for comparisons of samples and are used as the indicator of molecular weight herein.

The melt process conditions for making the polyester polymer, particularly the amounts of monomers used, depend on the polyester polymer composition that is desired. The amount of diol and diacid or dimethyl ester thereof are desirably chosen so that the final polymeric product contains the desired amounts of the various monomer units, desirably with equimolar amounts of monomer units derived from the diols and the diacids. Because of the volatility of some of the monomers, including isosorbide, and depending on such variables as whether the reactor is sealed (i.e. is under pressure) and the efficiency of the distillation columns used in synthesizing the polymer, some of the monomers may need to be included in excess at the beginning of the polymerization reaction and removed by distillation as the reaction proceeds. This is particularly true of ethylene glycol and isosorbide.

The exact amount of monomers to be charged to a particular reactor is readily determined by a skilled practitioner, but often will be in the ranges below. Excesses of ethylene glycol and isosorbide are desirably charged, and the excess ethylene glycol and isosorbide are removed by distillation or other means of evaporation as the polymerization reaction proceeds. Terephthalic acid or dimethyl terephthalate is desirably included in an amount of about 50% to about 100 mole %, more preferably 80 mole % to about 100 mole % of the diacid monomers that are charged, with the remainder being the optional diacid monomers. Isosorbide is desirably charged in an amount of about 0.25 mole % to about 150 mole % or more compared with the total amount of diacid monomers. The use of diethylene glycol monomer is optional, and is often made in situ. If diethylene glycol is added, it is charged in an amount up to about 20 mole % of the total amount of diacid monomers. Ethylene glycol is charged in an amount in the range of about 5 mole % to about 300 mole %, desirably 20 mole % to about 300 mole % of the diacid monomers, and the optional other diols are charged in an amount up to about 100 mole % of the diacid monomers.

The ranges given for the monomers used to make up the polyester polymer are very wide because of the wide variation in monomer loss during polymerization, depending on the efficiency of distillation columns and other kinds of recovery and recycle systems, and are only an approximation. Exact amounts of monomers that are charged to a specific reactor to achieve a specific composition are readily determined by a skilled practitioner.

In the polyester polymerization process, the monomers are combined, and are heated gradually with mixing with a catalyst or catalyst mixture to a temperature in the range of about 260° C. to about 300° C., desirably 280° C. to about 285° C. The exact conditions and the catalysts depend on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polyester polymer having a high enough molecular weight to be suitable for making fabricated products.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on whether the diacid monomer is polymerized as the free diacid or as a dimethyl ester. Germanium and antimony containing catalysts are the most preferred.

The monomer composition of the polyester polymer is chosen for specific uses and for specific sets of properties. For uses where a partially crystalline polymer is desired, as for example food and beverage containers, such as hot fill or cold fill bottles, fibers, and films, the polymer will generally have a monomer composition in the range of about 0.1% to about 10%, preferably about 0.25% to about 5% on a molar basis of isosorbide moieties, about 49.9 to about 33% on a molar basis of ethylene glycol moieties, about 0.0 to 5.0%, preferably 0.25% to about 5% on a molar basis of diethylene glycol moieties, and not more than about 2% on a molar basis of other diol moieties, such as 1,4-cyclohexanedi methanol. For the bottle resins, the diacid comprises terephthaloyl moieties at a level of about 35% to about 50% on a molar basis, and optional other aromatic diacid moieties at levels of up to about 15% on a molar basis, where the optional aromatic diacid moieties may be derived from 2,6-naphthalenedicarboxylic acid, isophthalic acid, 4,4'-bibenzoic acid, and mixtures thereof.

For applications where it is desirable to have an amorphous polymer, such as would be used to make transparent optical articles, the amount of isosorbide moiety is in the range of about 2% to about 30% on a molar basis, the ethylene glycol moieties are present in an amount of about 10% to about 48% on a molar basis, optional other diols such as 1,4-cyclohexanedimethanol moieties are present in an amount up to about 45% on a molar basis, diethylene glycol moieties are present in an amount of about 0.0% to about 5%, preferably 0.25% to about 5% on a molar basis, terephthaloyl moieties are present at a level of about 25% to about 50%, and other optional diacid moieties, such as 2,6-naphthalenedicarboxylic acid, isophthalic acid, 4,4'-bibenzoic acid, and mixtures thereof, are present in amounts up to a total of about 25%, on a molar basis.

Some of these compositions (i.e. those having isosorbide at levels of less than about 12%) are semi-crystalline if they are cooled slowly from the melt or if they are annealed above their glass transition temperatures, but are amorphous if they are cooled rapidly from the melt. In general, the compositions that can be semi-crystalline are slower to crystallize than poly(ethylene terephthalate) compositions, so that it is easier to make transparent articles that remain transparent using crystallizable copolymers even though they may be exposed to conditions under which they can crystallize.

The polyesters of the invention can be made by any of several methods. The product compositions vary somewhat depending on the method used, particularly in the amount of diethylene glycol moieties that are present in the polymer. These methods include the reaction of the diol monomers with the acid chlorides of terephthalic acid and any other acids that may be present. The reaction of terephthaloyl dichloride with isosorbide and ethylene glycol is readily carried out by combining the monomers in a solvent (e.g. toluene) in the presence of a base, such as pyridine, which neutralizes HCl as it is produced. This procedure is described in R. Storbeck et al., *J. Appl. Polymer Science*, Vol. 59, pp. 1199–1202 (1996). Other well-known variations using terephthaloyl dichloride may also be used (e.g. interfacial polymerization), or the monomers may simply be stirred together while heating.

When the polymer is made using the acid chlorides, the ratio of monomer units in the product polymer is about the same as the ratio of reacting monomers. Therefore, the ratio of monomers charged to the reactor is about the same as the desired ratio in the product. A stoichiometric equivalent of the diol and diacids generally will be used to obtain a high molecular weight polymer, e.g., one with an inherent viscosity of at least about 0.35 dL/g, suitable for making films.

The polymers can also be made by a melt polymerization process, in which the acid component is either terephthalic acid or dimethyl terephthlate, and also may include the free acid or dimethyl ester of any other aromatic diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill from the reactor as the polymerization proceeds. Therefore, an excess of these diols is desirably charged to the reaction to obtain a polymer, and the amounts must be adjusted according to the characteristics of the polymerization vessel, such as the efficiency of the distillation column and the efficiency of monomer recovery and recycle. Such modifications in the amounts of monomers and the like in accordance with the characteristics of a reactor are readily made by practitioners in the art.

The above-described melt polymerization process is the preferred method of making the polymer and is described in detail in commonly assigned U.S. Pat. No. 5,959,066, issued Sep. 28, 1999. The melt polymerization processes using dimethyl terephthalate and terephthalic acid are also summarized below.

Dimethyl Terephthalate Process

In this process, which is carried out in two steps, terephthalic acid and the optional diacid monomers, if present, are used as their dimethyl ester derivatives. In minor amounts, e.g., 1–2 wt %, free diacids may also be added. The diols (e.g. ethylene glycol and isosorbide) are mixed with the dimethyl ester of the aromatic diacid (e.g. dimethyl terephthalate) in the presence of an ester interchange catalyst, which causes exchange of the ethylene glycol for the methyl group of the dimethyl esters through a transesterification reaction. This results in the formation of methanol, which distills out of the reaction flask, and bis (2-hydroxyethylterephthalate). Because of the stoichiometry of this reaction, somewhat more than two moles of ethylene glycol are desirably added as reactants for the ester interchange reaction.

Catalysts that bring about ester interchange include salts (usually acetates) of the following metals: Li, Ca, Mg, Mn, Zn, Pb, and combinations thereof, Ti(OR)$_4$, where R is an alkyl group having 2–12 carbon atoms, and PbO. The catalyst components are generally included in an amount of about 10 ppm to about 100 ppm. Preferred catalysts for ester interchange include Mn(OAc)$_2$, Co(OAc)$_2$, and Zn(OAc)$_2$, where OAc is the abbreviation for acetate, and combinations thereof. The polycondensation catalyst in the second stage of the reaction, preferably Sb(III) oxide, may be added now or at the start of the polycondensation stage. A catalyst that has been used with particularly good success is based on salts of Mn(II) and Co(II), and at levels of about 50 to about 100 ppm, each. These were used in the form of Mn(II) acetate tetrahydrate and Co(II) acetate tetrahydrate, although other salts of the same metals may also be used.

Ester interchange is desirably brought about by heating and stirring the mixture of reactants under an inert atmosphere (e.g. nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or dimethyl terephthalate at temperatures below 300° C. Preferably, the additive has a boiling point greater than 170° C., more preferably within the range of 170° C. to 2400, and is used in an amount between about 0.05 and 10 wt %, more preferably between about 0.25 and 1 wt % of reaction mixture. A preferred additive is tetrahydronaphthalene. Other examples include diphenyl ether, diphenylsulfone and benzophenone. Other such solvents are described in U.S. Pat. No. 4,294,956, the contents of which are hereby incorporated by reference.

The second stage of the reaction is commenced by adding a polycondensation catalyst and a sequestering agent for the transesterification catalyst. Polyphosphoric acid is an example of a sequestering agent and is normally added in an amount of about 10 to about 100 ppm of phosphorous per gm of dimethyl terephthalate. An example of a polycondensation catalyst is antimony (III) oxide, which may be used at a level of 100 to about 400 ppm.

The polycondensation reaction is typically carried out at a temperature from about 250° C. to 285° C. During this time, ethylene glycol distills out of the reaction due to condensation of the bis(2-hydroxyethyl) terephthalate to form polymer and by-product ethylene glycol, which is collected as a distillate.

The polycondensation reaction described above is preferably carried out under vacuum, which can be applied while the reactor is being heated to the temperature of the polycondensation reaction after polyphosphoric acid and Sb(III) oxide have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a pre-determined level. This is observed as an increase in the torque needed for the stirring motor to maintain stirring. An inherent viscosity of up to about 0.65 dL/g or greater can be achieved by this melt polymerization process without further efforts at raising molecular weight. For certain composition ranges, the molecular weight can be increased further by solid state polymerization, described below.

Terephthalic Acid Process

The terephthalic acid process is similar to the dimethyl terephthalate process except that the initial esterification reaction that leads to bis(2-hydroxyethylterephthalate) and other low molecular weight esters is carried out at a slightly elevated pressure (autogenous pressure, about 25 to 50 psig). Instead of a two-fold excess of diols, a smaller excess (about 10% to about 60%) of diols (ethylene glycol, isosorbide and other diols, if any) is used. The intermediate esterification product is a mixture of oligomers, since not enough diol is present to generate a diester of terephthalic acid. The catalysts are also different. No added catalyst is necessary in the esterification reaction.

A polycondensation catalyst (e.g., Sb(III) or TI(IV) salts) is still desirable to achieve a high molecular weight polymer. The catalyst that is needed to achieve a high molecular weight can be added after the esterification reaction, or it can be conveniently charged with the reactants at the beginning of the reaction. Catalysts that are useful for making a high molecular weight polymer directly from terephthalic acid and the diols include the acetate or other alkanoate salts of Co(II) and Sb(III), oxides of Sb(III) and Ge(IV), and Ti(OR)$_4$ (where R is an alkyl group having 2 to 12 carbon atoms). Glycol solubilized oxides of these metal salts may also be used. The use of these and other catalysts in the preparation of polyesters is well-known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as polymer forms. The pressure is vented in the range of about 200° C. to about 250° C., and a vacuum is then desirably applied.

Esterification to form bis(2-hydroxyethylterephthalate) esters and oligomers takes place at elevated temperatures (between room temperature and about 220° C. to 265° C. under autogenous pressure), and polymer is made at temperatures in the range of about 275° C. to about 285° C. under a high vacuum (less than 10 Torr, preferably less than 1 Torr). The vacuum is needed to remove residual ethylene glycol, isosorbide and water vapor from the reaction to raise the molecular weight.

A polymer having an inherent viscosity of at least 0.5 dL/g, and generally up to about 0.65 dL/g can be achieved by the direct polymerization process, without subsequent solid state polymerization. The progress of the polymerization can be followed by the melt viscosity, which is easily observed by the torque that is required to maintain stirring of the molten polymer.

Solid State Polymerization

Polymers can be made by the melt condensation process described above having an inherent viscosity of at least about 0.5 dL/g, and often as high as about 0.65 dL/g, or greater without further treatment, measured by the method described above. This corresponds to a molecular weight that is suitable for many applications (e.g. molded products). Polymers with lower inherent viscosities can also be made, if desired, as for compact discs. Other applications, such as bottles, may require a still higher molecular weight. Compositions of ethylene glycol, isosorbide, and terephthalic acid having isosorbide in an amount of about 0.25% to about 10% on a mole basis may have their molecular weight increased further by solid state polymerization. The product made by melt polymerization, after extruding, cooling, and pelletizing, is essentially non-crystalline. The material can be made semi-crystalline by heating it to a temperature in the range of about 11 5° C. to about 140° C. for an extended period of time (about 2 to about 12 hours). This induces crystallization so that the product can then be heated to a much higher temperature to raise the molecular weight. The process works best for low levels of isosorbide (about 0.25 mole % to about 3 mole %), because the polyester crystallizes more easily with low levels of isosorbide.

The polymer may also be crystallized prior to solid state polymerization by treatment with a relatively poor solvent for polyesters such as acetone which induces crystallization. Such solvents reduce glass transition temperature (Tg) allowing for crystallization. Solvent induced crystallization is known for polyesters and is described in U.S. Pat. Nos. 5,164,478 and 3,684,766, which are incorporated herein by reference.

The crystallized polymer is subjected to solid state polymerization by placing the pelletized or pulverized polymer into a stream of an inert gas, usually nitrogen, or under a vacuum of 1 Torr, at an elevated temperature, above about 140° C. but below the melting temperature of the polymer for a period of about two to 16 hours. Solid state polymerization is generally carried out at a temperature in the range of about 1900 to about 210° C. for a period of about two to about 16 hours. Good results are obtained by heating the polymer to about 195° to about 198° C. for about 10 hours. This solid state polymerization may raise the inherent viscosity to about 0.8 dL/g or higher.

Thermoplastic Polymers

The thermoplastic polymers suitable for use in this invention are polycarbonates, styrene resins, alkyl acrylate resins, polyurethanes, vinyl chloride polymers, polyarylethers, copolyetherester block polymers, polyhydroxyethers, polyarylates, and other polyesters or mixtures thereof.

The thermoplastic polymers for use in the present application further include those polymers known to those skilled in the art for blending with, e.g., polyethylene terephthalate and polybutylene terephthalate based polyesters such as described on page 42 of Encyclopedia of Commercial Polymer Blends, ChemTech Publishing, Toronto (1994), the contents of which are hereby incorporated by reference, and as described in Appendices I.B, I.C and I.D and each of the patents described in Appendices II.B, II.E and II.F of Polymer Alloys and Blends Thermodynamics and Rheology, Hanser Publishers, distributed in the United States by Oxford University Press, NY (1990), the contents of each Appendix and the listed patents hereby being incorporated by reference including specifically the compositional listings of Appendices II.B, II.E and II.F.

Also specifically contemplated are the thermoplastic polymers which are described in U.S. Pat. No. 4,259,458, the contents of which are hereby incorporated by reference. These thermoplastic polymers are more specifically described below.

A. Polycarbonate

The thermoplastic aromatic polycarbonates that can be employed herein are homopolymers and copolymers and mixtures thereof which have an intrinsic viscosity of 0.35 to 2.0 dL/g as measured above. Typical of some of the dihydric phenols that may be employed in the practice of this invention are bisphenol-A (2,2-bis(4-hydroxyphenyl) propane), bis(4-hydroxphenyl)methane,2,2-bis(4-hydroxy-3-methylphenyl) propane, 4,4-bis(4-hydroxyphenyl) heptane, 4,4'-(3,3,5-trimethylcyclohexylidene) diphenol, 2,2-(3,5,3',5'-tetrachloro-4,4'-dihydroxydiphenyl) propane, 2,2-(3,5,3',5'-tetrabromo-4,4'-dihydroxydiphenyl)-propane, (3,3'-dichloro-4,4'-dihydroxydiphenyl) methane. Other dihydric phenols of the bisphenol-type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or inter-polymer rather than a homopolymer is desired for use in the preparation of the aromatic carbonate polymers of this invention.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl)carbonate, di-(bromophenyl) carbonate, di-(trichlorophenyl) carbonate, di-(tribromophenyl) carbonate, etc., di-(alkylphenyl) carbonates such as di(tolyl)carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (for example, bischloroformates of bisphenol-A, of hydroquinone, etc.) or glycols (for example, bishaloformates of ethylene glycol, neopentyl glycol, polyethylene glycol, etc.). While other carbonate precursors will occur to those skilled in the art, carbonyl chloride, also known as phosgene, is preferred.

The aromatic carbonate polymers of this invention may be prepared by using phosgene or a haloformate and by employing a molecular weight regulator, an acid acceptor and a catalyst. The molecular weight regulators which can be employed in carrying out the process of this invention include monohydric phenols such as phenol, para-tertiarybutylphenol, para-bromophenol, primary and secondary amines, i etc. Preferably, a phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonates can be prepared in a one-phase (homogeneous solution) or two-phase (interfacial) systems, when phosgene or a haloformate are used. Bulk reactions are possible with the diarylcarbonate precursors.

B. Styrene Resin

Styrene resins suitable for use herein include ABS-type polymers, the molecules of which consist of two or more polymeric parts of different compositions that are bonded chemically. The polymer is preferably prepared by polymerizing a conjugated diene such as butadiene or a conjugated diene with a monomer copolymerizable therewith such as styrene to provide a polymeric backbone. After formation of the backbone, at least one grafting monomer and preferably two are polymerized in the presence of the prepolymerized backbone to obtain the graft polymer.

The backbone polymer, as mentioned, is preferably a conjugated diene polymer such as polybutadiene polyisoprene, or a copolymer such as butadiene-styrene, butadiene-acrylonitrile, or the like.

The specific conjugated diene monomers normally utilized in preparing the backbone of the graft polymer portion of the blends of this invention are generically described by the formula:

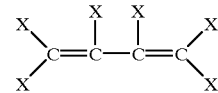

wherein X may be selected from the group consisting of hydrogen, alkyl groups containing from one to five carbon atoms, chloro and bromo. Examples of dienes that may be used are butadiene, isoprene; 1,3-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3-and 2,4-hexadienes, chloro and bromo substituted butadienes such as dichlorobutadiene, bromobutadiene, dibromobutadiene, mixtures thereof, and the like. The preferred conjugated diene utilized herein is butadiene.

A group of monomers that may be polymerized in the presence of the prepolymerized backbone are preferably monovinylaromatic hydrocarbons. The monovinyl-aromatic monomers utilized are generically described by the formula:

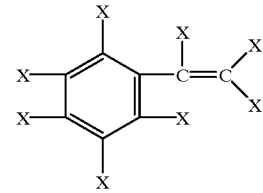

wherein X may be selected from the group consisting of hydrogen, alkyl groups containing from one to five carbon atoms, chloro and bromo. Examples of the monovinylaromatic compounds and substituted monovinylaromatic compounds that may be used are styrene and other vinyl substituted aromatic compounds including alkyl-, cycloalkyl-, aryl-, alkaryl-, aralkyl-, alkoxy-, aryloxy-, and other substituted vinylaromatic compounds. Examples of such compounds are 3-methylstyrene; 3,5-diethylstyrene and 4-n-propylstyrene, α-methylstyrene, α-methyl vinyltoluene, α-chlorostyrene, α-bromo-styrene, dichlorostyrene, dibromostyrene, tetra-chlorostyrene, mixtures thereof, and the like. The preferred monovinylaromatic hydrocarbons used therein are styrene and/or α-methylstyrene.

A second group of monomers that may be polymerized in the presence of the prepolymerized backbone are acrylonitrile, substituted acrylonitrile and/or acrylic acid esters exemplified by acrylonitrile and alkyl acrylates such as methyl methacrylate. The acrylonitrile, substituted acrylonitrile, or acrylic acid esters are described generically by the formula:

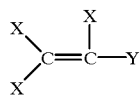

wherein X may be selected from the group consisting of hydrogen, alkyl groups containing from one to five carbon atoms, chloro and bromo and Y is selected from the group consisting of cyano and carbalkoxy wherein the alkyl group of the carbalkoxy group contains from one to about twelve carbon atoms. Examples of monomers of this description are acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, isobutyl acrylate, mixtures thereof and the like. The preferred acrylic monomer used herein is acrylonitrile and the preferred acrylic acid esters are ethyl acrylate and methyl methacrylate.

In the preparation of the graft polymer, the conjugated diolefin polymer or copolymer exemplified by 1,3-butadiene polymer or copolymer comprises from about 50% by weight to about 5% by weight of the total graft polymer composition and the monomers polymerized in the presence of the backbone exemplified by styrene and acrylonitrile comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition and the monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the compositions used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer. It is contemplated in this invention that the graft polymer composition may contain up to 90% of free copolymer.

Optionally, the elastomeric backbone may be an acrylate rubber such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

While not previously mentioned, styrene maleic anhydride-type polymers may be used in the blends of the present invention.

C. Alkyl Acrylate Resin

The alkyl acrylate resin used in the present invention includes a homopolymer of methyl methacrylate (i.e. polymethyl methacrylate) or a copolymer of methyl methacrylate with a vinyl monomer (e.g. acrylonitrile, N-allylmaleimide, N-vinyl maleimide, or an alkyl acrylate or methacrylate in which the alkyl group contains from 1 to 8 carbon atoms such as methyl acrylate, ethyl acrylate, butyl acrylate, ethyl methacrylate and butyl methacrylate). The amount of methyl methacrylate is not less than 70% by weight of this copolymer resin. The methyl methacrylate resin may have a reduced viscosity of from 0.1 to 2.0 dL/g in a 1% chloroform solution at 25° C.

The alkyl acrylate resin may be grafted onto an unsaturated elastomeric backbone such as polybutadiene, polyisoprene, and/or butadiene or isoprene copolymers. In the case of the graft copolymer, the alkyl acrylate resin comprises greater than 50 weight percent of the graft copolymers.

D. Polyurethanes

These thermoplastic polyurethanes may be synthesized by methods disclosed in U.S. Pat. No. 3,214,411 incorporated herein by reference. A particularly useful polyester resin used as a starting material for the thermoplastic polyurethane are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water contents is from about 0.01 to about 0.2%, preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-proplylene glycol and the like. In addition to the glycols, a small amount of trihydric alcohol of up to about 1% may be used along with the glycols such as, for example, trimethylolpropane, glycerol, hexanetriol and the like. The resulting hydroxyl polyester has a molecular weight of at least about 600, a hydroxyl number of about 25 to about 190 and preferably between about 40 and about 60, and acid number of between about 0.5 and about 2 and a water content of 0.01 to about 0.2%.

The organic diisocyanate to be used in the preparation of the elastomer is preferably 4,4'-diphenylmethane diisocyanate. It is desired that the 4,4'-diphenylmethane diisocyanate contain less than 5% of 2,4'-diphenylmethane diisocyanate and less than 2% of the dimer of diphenylmethane diisocyanate. It is further desired that the acidity calculated as HCl is from about 0.0001 to about 0.02%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic processable polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, pentamethylene diisocyanate, hexamethylene diisocyanate, 1-chlorobenzene-2,4-diisocyanate, furfurylidene diisocyanate and the like.

Any suitable chain extending agent having active hydrogen containing groups reactive with isocyanate groups may be used such as, for example, diols including ethylene glycol, propylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methylcyclohexane), hexanediol, thiodiglycol and the like; diamines including ethylene diamine, propylene diamine, butylene diamine, hexamethylene diamine, cyclohexylene diamine, phenylene diamine, toluylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516, 2,621,166 and 2,729,618 incorporated herein by reference may be used. If desirable, a small amount of polyfunctional material may be utilized. This polyfunctional chain extender, however, should not be present in an amount greater than about 1% by weight. Any suitable polyfunctional compound may be used in this application such as, for example, glycerol, trimethylolpropane, hexanetriol, pentaerythritol and the like.

In accordance with the process of this invention, the polyester, the organic diisocyanate and the chain extender may be individually heated preferably to a temperature of from about 600 to about 135° C. and then the polyester and chain extender are substantially simultaneously mixed with the diisocyanate. Of course, to increase the rate of reaction, any suitable catalyst may be added to the reaction mixture such as tertiary amines and the like as set forth in U.S. Pat. Nos. 2,620,516, 2,621,166 and 2,729,618. Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like. Polyesters based on ε-caprolactone are also preferred.

A polyether may be used instead of the polyester in the preparation of the thermoplastic polyurethane and preferably polytetramethylene glycol having an average molecular weight between about 600 and 2000 and preferably about 1000. Other polyethers such as polypropylene glycol, polyethylene glycol and the like may be used providing their molecular weight is above about 600. The above and other thermoplastic polyurethanes such as disclosed in U.S. Pat. Nos. 2,621,166, 2,729,618, 3,214,411, 2778,810, 3,012,992, Canadian Patent Nos. 754,233, 733,577 and 842,325 all incorporated herein by reference may be used to produce the thermoplastic polyurethanes.

E. Vinyl Chloride Polymers

Vinyl chloride polymers for the purpose of this invention are polyvinyl chloride and copolymers of vinyl chloride with olefinically unsaturated polymerizable compounds which contain at least 80 percent by weight of vinyl chloride incorporated therein. Olefinically unsaturated compounds which are suitable for copolymerization are, for example, vinylidene halides such as vinylidene chloride and vinylidene fluoride, vinyl esters such as vinyl acetate, vinyl propionate, vinyl butyrate, vinyl chloroacetate, vinyl benzoate, acrylic and α-alkyl-acrylic acids and their alkyl esters, amides and nitriles, methacrylic acid, methyl methacrylate, ethyl acrylate, 2-ethyl-hexylacrylate, butyl methacrylate, acrylamide, N-methyl acrylamide, acrylonitrile and methacrylonitrile, aromatic vinyl compounds such as styrene and vinyl naphthalene and olefinically unsaturated hydrocarbons such as ethylene, bicyclo-[2,2,1]-hept-2-ene and bicyclo-[2,2,1]-hepta-2,5-dienes. These vinyl chloride polymers are known and can be prepared by the usual methods of emulsion, suspension, bulk or mass polymerization. Vinyl chloride polymers which have molecular weights of 40,000 to 60,000 are preferred.

F. Poly(aryl ether)s

The poly(aryl ether) resin useful in the blend may be described as a linear, thermoplastic polyarylene polyether polysulfone, wherein the arylene units are interspersed with ether and sulfone linkages. These resins may be obtained by reaction of an alkali metal double salt of a dihydric phenol and a dihalobenzenoid compound, either or both of which contain a sulfone linkage —SO$_2$— between arylene groupings, to provide sulfone units in the polymer chain in addition to arylene units and ether units. The polysulfone polymer has a basic structure composed of recurring units of the formula

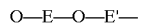

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. No. 3,264,536, the disclosure of which is hereby incorporated herein by reference, for the purpose of describing and exemplifying E and E' in more detail, including the preferred forms of E derived from dinuclear phenols having the structure:

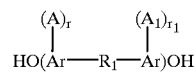

Ar is an aromatic group and preferably is a phenylene group. A and A$_1$ can be the same or different inert substituent groups as alkyl groups having from 1 to 4 carbon atoms, halogen atoms, i.e., fluorine, chloride, bromine or iodine, or alkoxy radicals having from 1 to 4 carbon atoms, r and r$_1$ are integers having a value of from 0 to 4, inclusive, and R$_1$ is representative of a bond between aromatic carbon atoms as in dihydroxydiphenyl, or is a divalent radical, including, for example, CO, O, S, S—S, SO$_2$ and divalent organic hydrocarbon radicals such as alkylene, alkylidene, cycloalkylene, or the halogen, alkyl, aryl or like substituted alkylene, alkylidene and cycloalkylene radicals as well as alkarylene and aromatic radicals and a ring fused to both Ar groups. Typical preferred polymers are composed of recurring units having the formula:

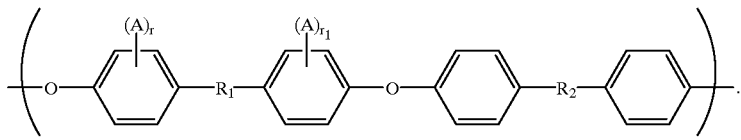

In the foregoing, formula A and A1 can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and $r_1$ are integers having a value of from 0 to 4, inclusive. Typically, $R_1$ is representative of a bond between aromatic carbon atoms or a divalent connecting radical and $R_2$ represents sulfone, carbonyl, sulfoxide. Preferably, $R_1$ represents a bond between aromatic carbon atoms. Even more preferred are the thermoplastic polyarylene polysulfones of the above formula wherein r and $r_1$ are zero. $R_1$ is a divalent connecting radical of the formula

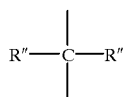

wherein R″ represents a member of the group consisting of alkyl, lower aryl, and the halogen substituted groups thereof, and $R_2$ is a sulfone group.

Typical examples are the reaction products prepared from 2,2-bis-(4-hydroxyphenyl) propane (source of E residue) with 4,4'-dichloro-diphenylsulfone (source of E' residue) and equivalent reaction products such as those from 4,4'-dichlorodiphenylsulfone with bisphenol of benzophenone (4,4'-dihydroxydiphenyl ketone), or the bisphenol of acetophenone [1,1-bis(4-hydroxyphenyl)ethane], or the bisphenol of vinyl cyclohexane [1-ethyl-1-(4-hydroxyphenyl)-3-(4-hydroxyphenylcyclo-hexane)], or 4,4'-dihydroxydiphenyl sulfone or alpha, alpha'-bis(4-hydroxyphenyl)-p-diisopropylbenzene.

Further useful discussion of the polysulfone resins which may be used is to be found in British Pat. No. 1,060,546.

G. Copolyetherester Block Copolymer

The polyetheresters consist essentially of a multiplicity of recurring intralinear long chain and short chain ester units connected head-to-tail through ester linkages, said long chain ester units being represented by the following structure:

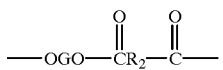

and said short chain ester units being represented by the following structure:

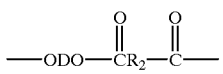

wherein:
G is a divalent radical remaining after removal of terminal hydroxy groups from a poly(alkylene oxide) glycol having a molecular weight of about 400–3500; D is a divalent radical remaining after removal of hydroxyl groups from a low molecular weight diol having a molecular weight less than about 250; and $R_2$ is a divalent radical remaining after removal of carboxyl groups from a dicarboxylic acid having a molecular weight less than about 300; with the provisos that the short chain ester units constitute about 25–65% by weight of the copolyester, at least about 70% of the $R_2$ groups must be 1,4-phenylene radicals, at least about 70% of the D groups must be the 1,4-butylene radicals, and the sum of the percentages of the $R_2$ groups which are not 1,4-phenylene radicals and of the D groups which are not 1,4-butylene radicals cannot exceed about 30%.

The term "long chain ester units" as applied to units in a polymer chain refers to the reaction product of a long chain glycol with a dicarboxylic acid. The long chain glycols of the instant invention are poly(alkylene oxide) glycols having a molecular weight between about 400 and 3500, preferably between about 600 and 2000. Copolyesters prepared from poly(alkylene oxide) glycols having a molecular weight of about 600–2000 are preferred because they exhibit useful properties over a wide range of temperature, combined with limited water swell. Copolyesters prepared from poly(alkylene oxide) glycols having a molecular weight in excess of about 3500 may crystallize and lose their elastomeric character and good low temperature properties. Copolyester prepared from glycols having molecular weights below about 400 have useful properties only within a narrow temperature range and are less suited for injection molding and extrusion because of a slower rate of crystallization of the resultant block copolymer. The long chain glycols contain a major proportion of tetramethylene oxide units. In a preferred embodiment of the instant invention the long chain glycols will be entirely poly(tetramethylene oxide) glycol. In some instances it may be desirable to use random or block copolymers of tetramethylene oxide containing minor proportions of a second alkylene oxide. Typically, the second monomer will constitute less than about 40 mole percent of the poly(alkylene oxide) glycols and preferably less than 20 mole percent. Representative examples of the second monomer include 1,2- and 1,3-propylene oxides, 1,2-butylene oxide and ethylene oxide.

The term "short chain ester units" as applied to units in a polymer chain refers to low molecular weight compounds or polymer chain units having molecular weights less than about 550. They are made by reacting a low molecular weight diol (below about 250) with a dicarboxylic acid.

Included among the low molecular weight diols (other than 1,4-butanediol) which react to form short chain ester units are acyclic, alicyclic and aromatic dihydroxy compounds. Preferred are diols with 2–15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bisphenols which can be used are bis(p-hydroxy) diphenyl, bis(p-hydroxyphenyl)methane, and bis(p-hydroxyphenyl)propane. Equivalent esterforming derivatives of diols are also useful (e.g., ethylene oxide or ethylene carbonate can be used in place of ethylene glycol). The term "low molecular weight diols" as used herein should be construed to include such equivalent ester-forming derivatives: provided, however, that the molecular weight requirement pertains to the diol only and not to its derivatives.

Dicarboxylic acids (other than terephthalic acid) which are reacted with the foregoing long chain glycols or low molecular weight diols to produce the copolyesters of this invention are aliphatic, cycloaliphatic or aromatic dicarboxylic acids of a low molecular weight. The term "dicarboxylic acids" as used herein, includes acid equivalents of lo dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the elastomeric compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often can not be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals such as —O— or —SO$_2$—, alkylene, alkylidene, etc.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexane-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4-bicyclohexyl dicarboxylic acid, decahydro-2,6-naphthylene dicarboxylic acid, 4,4-methylenebis-(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic, terephthalic and isophthalic acids, substituted dicarboxy compounds with two benzene nuclei such as bis(p-carboxyphenyl)-methane, p-carboxyphenyl/oxybenzoic acid, ethylenebis(p-oxybenzoic acid) 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid and $C_1$–$C_{12}$ alkyl and ring substituted derivatives thereof, such as halo, alkoxy, and aryl derivatives. Hydroxy acids such as p(P-hydroxyethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., terephthalic and isophthalic acids. The most preferred copolyesters of this invention are those prepared from dimethylterephthalate, 1,4-butanediol and poly(tetramethylene oxide) glycol having a molecular weight from about 600–1500.

Desirable polyetheresters are described in, for example, U.S. Pat. Nos. 3,784,520 and 3,766,146.

H. Polyhydroxyether

The thermoplastic polyhydroxyethers in the present invention have the general formula

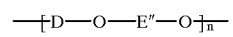

wherein D is the radical residuum of a dihydric phenol, E" is a radical residuum of an epoxide selected from mono- and diepoxides and contains from 1 to 2 hydroxyl groups and n is an integer which represents the degree of polymerization and is at least 30 and preferably is above about 80.

In general, thermoplastic polyhydroxyethers are prepared by contacting under polymerization conditions a dihydric phenol and an epoxide containing from 1 to 2 epoxide groups in substantially equimolar amounts.

The product produced by the reaction between bis-phenol-A and epichlorohydrin has the repeating unit

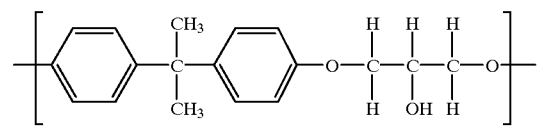

and can be termed a poly(monohydroxyether) of bis-phenol-A.

The product produced by the reaction between hydroquinone and butadiene dioxide has the repeating unit

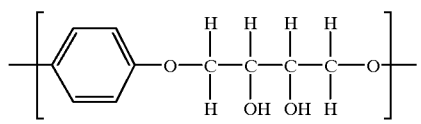

and can be termed a poly(dihydroxyether) of hydroquinone.

By the use of both a monoepoxide and a diepoxide poly(hydroxy-dihydroxyethers) can be obtained, the relative amounts of mono- and diepoxide determining the final concentration of the mono- and dihydroxy containing repeating units E" in the polymer.

Any dihydric phenol can be used in forming polyhydroxyethers. Illustrative dihydric phenols are mononuclear dihydric phenols such as hydroquinone, resorcinol, and the like as well as the polynuclear phenols which are preferred. The dihydric polynuclear phenols have the general

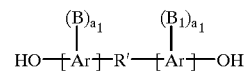

formula:
wherein: Ar is an aromatic divalent hydrocarbon radical such as naphthylene and phenylene with phenylene being preferred for the thermoplastic polyhydroxyethers used in this invention; B and $B_1$ which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having a maximum of 4 carbon atoms, a and a, are independently integers of 0 to 4, R' is alkylene, alkylidene, cycloalkylene or a saturated divalent group. Particularly preferred are dihydric polynuclear phenols having the general formula:

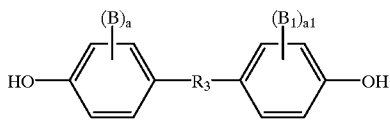

wherein B, $B_1$, a and a, are as previously defined, and $R_3$ is an alkylene or alkylidene group, preferably having from 1 to 3 carbon atoms inclusive or cycloalkylene or $R_3$ is a saturated divalent group such as is obtained from compounds such as vinylcyclohexane and dipentene or its isomers by reaction with two moles of phenol per mole of the compound. $R_3$ preferably contains from 1 to 9 carbon atoms.

Diepoxides useful for the preparation of polyhydroxyethers can be represented by the formula

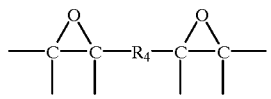

wherein $R_4$ is representative of a bond between adjacent carbon atoms or a divalent inorganic or organic radical such as an aliphatic, aromatic, homocyclic, heterocyclic or acyclic arrangement of atoms.

By the term "diepoxide" is meant a compound containing two epoxide groups i.e. groups containing an oxirane oxygen atom bonded to two vicinal aliphatic carbon atoms. Saturated diepoxides in which both the oxirane oxygen atoms are bonded to carbon atoms of a saturated aliphatic hydrocarbon chain are particularly preferred. The term "saturated diepoxides" refers to diepoxides which are free of ethylenic unsaturation, i.e. —C=C— and acetylenic unsaturation, i.e. —C≡C—. Diepoxides which contain solely carbon, hydrogen and oxygen atoms are especially preferred. The oxygen atoms can be (in addition to oxirane oxygen), ether oxygen, i.e. —O— oxacarbonyl oxygen, i.e.

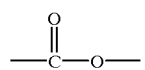

carbonyl oxygen, i.e.

and the like. A single diepoxide or a mixture of at least two diepoxides can be employed in preparing the polydihydroxyethers of the present invention and the term "diepoxide" is intended to include a mixture of at least two diepoxides.

Other diepoxides which can be mentioned include those wherein the two oxirane groups are linked through an aromatic ether, i.e. compounds having the grouping

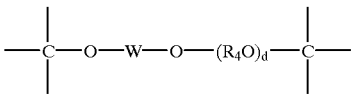

wherein $R_4$ is a divalent organic radical, W is a divalent aromatic radical residuum of a dihydric phenol such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art such as those detailed in, for example, U.S. Pat. Nos. 3,238,087; 3,305,528; 3,294,747 and 3,277,051.

I. Polyarylates

The polyarylates of this invention are desirably derived from a dihydric phenol and an aromatic dicarboxylic acid.

A particularly desirable dihydric phenol is of the following formula:

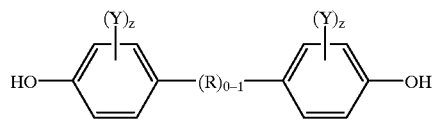

wherein Y is selected from alkyl groups of 1 to 4 carbon atoms, chlorine or bromine, z has a value of from 0 to 4, inclusive, and R' is a divalent saturated aliphatic hydrocarbon radical, particularly alkylene and alkylidene radicals having from 1 to 3 carbon atoms, and cycloalkylene radicals having up to and including 9 carbon atoms. The preferred dihydric phenol is Bisphenol-A. The dihydric phenols may be used individually or in combination.

Additionally, said dihydric phenols can be used in combination with a dihydric phenol of the following formula:

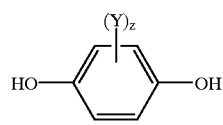

wherein Y and z are as previously defined.

Suitable aromatic dicarboxylic acids include terephthalic acid, isophthalic acid, naphthalene dicarboxylic acids, and mixtures thereof, as well as alkyl substituted homologs of these carboxylic acids wherein the alkyl groups contain from 1 to about 4 carbon atoms, and acids containing other inert substituents such as halides, alkyl or aryl ethers, and the like.

The polyarylates contain from about 95 to 0 mole percent of terephthalic acid and from about 5 to 100 mole percent of isopthalic acid. More preferably, the polyarylates contain a mixture of from about 25 to about 75 mole percent of terephthalic acid and from about 75 to about 25 mole percent of isophthalic acid. A polyarylate containing a mixture of 50 mole percent of terephthalic acid and 50 mole percent of isophthalic acid is most preferred.

The polyarylates of the present invention can be prepared by any of the well-known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of the dihydric phenol. These processes are described in, for example, U.S. Pat. Nos. 3,317,464; 3,948,856; 3,780,148; 3,824,213 and 3,133,898.

J. Other Polyesters

Other polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

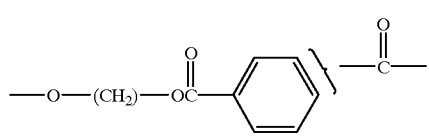

(I)

wherein n is an integer of from 2 to 4. Desirably these other polyesters do not contain the isosorbide moiety. However, blends of different polyesters both containing an isosorbide moiety are contemplated. Also contemplated are the polyesters described in copending application Ser. No. 09/064,720.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to about 50 carbon atoms, including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like. In addition, there can be minor amounts of units derived from aliphatic glycols and polyols, e.g., of up to about 50 carbon atoms include, among others, propylene glycol, glycerol, diethylene glycol, triethylene glycol and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid so as to produce a polyester having recurring units having the following formula:

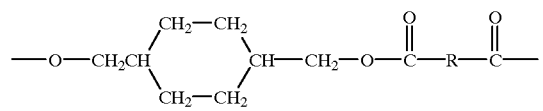

(II)

wherein the cyclohexane ring is selected from the cis- and trans-isomers thereof and R represents an aryl radical containing 6 to 20 carbon atoms and which is the dicarboxylated residue derived from an aromatic dicarboxylic acid.

Examples of aromatic dicarboxylic acids indicated by R in formula II, include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5- or 2,6- or 2,7-naphthalene-dicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with a mixture of iso- and terephthalic acids. These polyesters have repeating units of the formula:

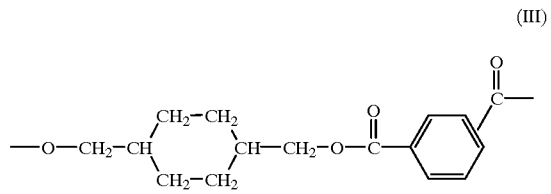

(III)

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof of, for example, 1,4-cyclohexanedimethanol and an alkylene glycol with an aromatic dicarboxylic acid so as to produce a copolyester having repeating units of the following formula:

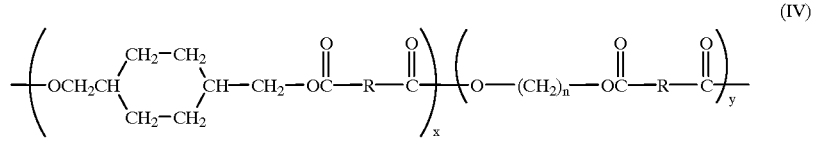

(IV)

wherein the cyclohexane ring is selected from the cis- and trans-isomers thereof, R is as previously defined, n is an integer of 2 to 4, the x units comprise from about 1 0 to about 90 percent by weight and the y units comprise from about IO to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

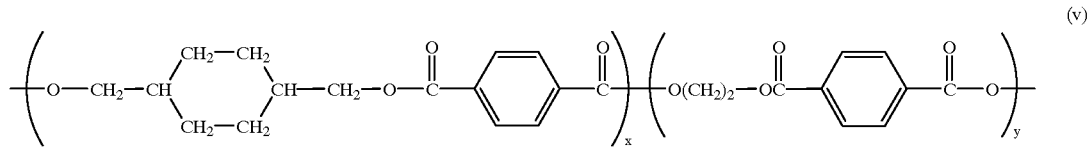

wherein x and y are as previously defined.

Polymer Blends

The polyester polymer of the present invention is desirably used in amounts of from about 5 to about 95, preferably from about 40 to about 60 weight percent even more desirably from about 45 to about 55 weight percent. The exact composition and amounts of the various components are dependent mainly on the desired product.

The compositions of this invention are prepared by any conventional mixing methods. A preferred method includes mixing the polyester and thermoplastic polymer or mixtures thereof in powder or granular form in an extruder and extruding the mixture into strands, chopping the strands into pellets and molding the pellets into the desired article.

Additives

It should, of course, be apparent to those skilled in the art that other additives may be included in the present compositions. These additives include plasticizers; pigments; flame retardant additives, particularly, decabromodiphenyl ether and triarylphosphates, such as triphenylphosphate; reinforcing agents, such as glass fibers; thermal stabilizers; ultraviolet light stabilizers; processing aids; impact modifiers; flow enhancing additives; nucleating agents to increase crystallinity; and the like. Other possible additives include polymeric additives such as ionomers, liquid crystal polymers, fluoropolymers, olefins including cyclic olefins, polyamides and ethylene vinyl acetate copolymers.

This invention is further illustrated by the following non-limiting examples.

EXAMPLES

This section dscribes the synthesis of polymers used to make blends with polycarbonate, polybutyleneterephthalate (PBT), reinforcing glass fibers, core shell elastomers for toughening and nucleating agents for increasing crystallinity and heat deflection temperatures.

The polymer molecular weights are estimated based on inherent viscosity (I.V.), which is measured for a 1% solution (wt./volume) of polymer in o-chlorophenol at a temperature of 25° C. The levels of catalyst components are expressed as ppm, based on a comparison of the weight of the metal with the weight of either the dimethyl terephthalate or terephthalic acid, depending on which monomer is used.

Example 1

The following polymerization reactants are added to a 50 gal. maximum capacity, Hastalloy B polymerization reactor fitted with a 6" radius, Hastalloy B, water cooled reflux column packed with stainless steel rings, a stainless steel helix agitator stirrer, a water-cooled condenser and by-pass: dimethyl terephthalate (78.02 kg), isosorbide (15.42 kg), and ethylene glycol (49.90 kg), which corresponds to a mole ratio of 1: 0.26: 2.00. The catalyst is also charged and consists of Mn(II) acetate tetrahydrate (29.57 g), Co(II) acetate tetrahydrate (21.43 g), and Sb(III) oxide (35.02 g). This corresponds to 85 ppm manganese (weight of metal as a fraction of the weight of dimethyl terephthalate), 90 ppm cobalt, and 375 ppm antimony. The stirred reactor (50 rpm) is purged with a stream of nitrogen while the temperature is raised to 250° C. over a period of four hours. The reactor is jacketted and uses a temperature controlled, hot oil loop system as a heating medium. Methanol is continuously collected as the reaction is heated above approximately 150° C. By noting when the temperature drops at the top of the packed reflux column it is possible to determine the end of methanol evolution, indicating the finish of the first step of the reaction, which is the transesterification of the diols and dimethyl terephthalate. At this point, 77 ppm of phosphorous is added in the form of a polyphosporic acid solution in ethylene glycol. In this case, 153 ml of the solution, which has a concentration of 10.91 g phosphorous per 100 g of polyphosphoric acid solution is used. Also at this time, the nitrogen purge is stopped. Heating is continued. The reaction is heated to 285° C. over a period of about 2 hours. Vacuum is then gradually applied using a multi-vane vacuum pump with 20 horse-power blower. The attainment of full vacuum, preferably less than 1 Torr, takes approximately 1 hour. During this time, ethylene glycol distills off, and a low molecular weight polymer forms. The molten polymer is heated under vacuum at 285° C. for about 2 hours, until the polymer achieves sufficient melt viscosity, as determined by an increase in torque of the stirrer. When sufficient viscosity is achieved, the polymerization is stopped, and the reactor is emptied through a heated die at the bottom. The molten polymer emerges as a strand that when cooled through immersion in a cold water trough can be chopped into pellets. The polymer pellets are dried overnight in a rotating drum heated to 120° C.

The cooled polymer is removed from the flask and ground. The solution inherent viscosity (I.V.) of the material is 0.64 dL/g.

The monomer unit composition of the polymer, determined by proton NMR, is about 6% isosorbide, 42% ethylene gylcol, 2% diethylene glycol, and 50% terephthalic acid, all expressed as a mole % of the polymer. It is noteworthy that the amount of isosorbide in the polymer is approximately half of the amount that is charged, when compared with the amount of terephthalic acid. Unreacted isosorbide is found in the distillates, especially in the ethylene glycol. The amount of isosorbide in the polymer by this process thus is very dependent on the efficiency of the distillation or other separation methods that are used in the process. A skilled practitioner can readily establish specific process details according to the characteristics of the reactor, distillation columns, and the like.

Example 2

The second example is prepared in a way similar to the first except that a smaller reactor (5 gal. maximum capacity) is used. The reagent equivalent ratios are also changed in order to prepare a polymer with a greater content of isosorbide. Thus, dimethyl terephthalate (10,680 g), isosorbide (5,787 g), and ethylene glycol (4,881 g), which corresponds to a mole ratio of 1:0.72:1.43 are charged to the reactor in a similar fashion as before along with the catalyst consisting of Mn(II) acetate tetrahydrate (4.76 g), and Ge(IV) oxide (4.66 g). This corresponds to 100 ppm manganese (weight of metal as a fraction of the weight of dimethyl terephthalate) and 300 ppm germanium. The germanium oxide is added in the form of a solution in ethylene glycol (0.100 N $GeO_2$ in ethylene glycol). A solution of polyphosphoric acid in ethylene glycol is added in a similar way as before, in this case 9.6 ml, which has a concentration of 3.45 g P per 100 ml of polyphosphoric acid solution, is used. The polymerization proceeded in a similar fashion as before, however, the resultant finished resin did not achieve the same inherent viscosity within the given time. In this case a solution I.V. of 0.42 dL/g is observed. It was also observed that the monomer unit composition of the polymer, determined by proton NMR, is about 13% isosorbide, 34% ethylene gylcol, 3% diethylene glycol, and 50% terephthalic acid, all expressed as a mole % of the polymer. The extent of isosorbide incorporation is somewhat lower in this case than previously observed but reflects the efficiency of the differing reactors rather than the polymer made.

Example 3

The third example is prepared in a way similar to the first except that a larger reactor (100 gal) equipped with a stainless steel anchor type stirrer is used. The monomers charged are such that an isosorbide content in the finished polymer would be 1 mole %, assuming that some of the input isosorbide would be distilled off during polymerization. As such, dimethyl terephthalate (197 kg), isosorbide (5.12 kg), and ethylene glycol ( 135 kg) along with the catalysts: Mn(II) acetate tetrahydrate (72.1 g), Co(II) acetate tetrahydrate (54.1 g) and Sb(III) oxide (88.5 g) are used. This corresponds to 82 ppm manganese, 65 ppm Co, and 375 ppm Sb calculated using the same basis as in example 1. The transesterification process is carried in an analogous way as for example 1. A polyphosphoric acid solution in ethylene glycol is added such that 80 ppm of P is used to sequester the transition metals after the transesterification step and before the polycondensation as outlined in Example 1. The polycondensation is also similar to the previous example. Polymer is extruded and pelletized to give clear, colorless resin.

Unlike the previous example, the resin produced with lower isosorbide content can be solid-state polymerized. The pelletized polymer is loaded into a tumble dryer and under a stream of nitrogen is heated to 115° C. over a period of 4 hours and then held at that temperature for another 6 hours. This allows the polymer to partially crystallize. After this treatment, a vacuum is applied to the tumble dryer ulitmately achieving a vacuum less than 1 mm of Hg. The heating is continued and reaches a maximum of 213° C. It is then held at this elevated temperature for a total of approximately 15 hours. This effects a solid-state polymerization and allows the molecular weight to be significantly increased, as judged by the inherent viscosity (I.V.) of the polymer solution in ortho-chlorophenol. The solution I.V. of the material increases from about 0.5 dL/g to about 0.7 dL/g during the solid state polymerization.

Example 4

This polymer is prepared in a similar way to that for example 3 except that the amounts of diols were changed in order to result in a resin with a somewhat increased isosorbide content. Thus, the only alterations are in the amount of isosorbide charged, 17.8 kg, and the amount of Mn(II) acetate tetrahydrate catalyst used, 79.2 g corresponding to 90 ppm Mn(II) calculated on the same basis as in the above example. The transesterification and polycondensation are repeated as has been just described. Also, the finished polymer is pelletized, crystallized, and solid-state polymerized in an identical fashion to the previous example. This results in a polymer with approximately 3 mole % isosorbide content.

Example 5

This example describes a blend of isosorbide containing polymer with polycarbonate. A polymer made by Example 2 is blended with polycarbonate to make a tougher material while maintaining contact optical transparency. The polycarbonate is obtained from Dow Chemical(Caliber 302) and blended with polymer of Example 2 in a Leistritz brand extruder (Model MC18GG/GL, Leistritz AG). The design of the twin screws consists of conveying elements, 3 kneading blocks and then additional conveying elements. The ratio of the length L to diameter D is 30 . The barrel temperature is 260° C. and the screw rotation speed is 225 rpm. The extrudate is pelletized, dried overnight and molded into tensile and flexure bars for mechanical testing. The molding machine is an Arburg Allrounder (Model 220 M) made by Arburg Maschinen Fabrik(Lossburg, Germany). The molding conditions are: barrel temperature 280° C., the mold temperature 50° C., screw speed 210 rpm, injection pressure 25 bar, cool time 25 seconds. The composition and physical properties of the blends are shown in Table 1. The optical haze of the blends is measured on a flexure bar with a Macbeth Color Eye 7000 (Kollmorgen Instruments) according to ASTM D1003 (published by the American Society of Testing Materials, Philadelphia, Pa., Vol. 8.01). The molded samples have contact transparency.

TABLE 1

| Composition (wt %) | | Example 5A | Example 5B | Example 5C |
|---|---|---|---|---|
| Polycarb calibre 302(%) | | 80 | 50 | 20 |
| PEIT-13(%) | | 20 | 50 | 80 |
| ASTM method | | | | |
| D638 | tensile modulus (MPSI) | na | 0.34 | na |
| D638 | tens. elong @ bk(%) | na | 118 | na |
| D638 | ten stress @ bk(ksi) | na | 7.3 | na |
| D638 | tens. elon @ yld(%) | na | 6 | na |

TABLE 1-continued

| Composition (wt %) | | Example 5A | Example 5B | Example 5C |
|---|---|---|---|---|
| D638 | tens. stress @ yld(ksi) | na | 9 | na |
| D256 | Notched Izod(ft-lb) @ 20° C. | 3.1 | 1.53 | 0.63 |
| D648 | HDT(° C.)(264 psi) | 1.16 | 101 | 91 |
| D1746 | Total Optical transmission(%) | na | 80 | na |
| D1003 | Haze(%) | na | 78 | na | na: not available

Example 6

This example describes a blend of isosorbide containing polymers together with PBT and core shell elastomer for toughening the blend. The polymer of example 1 (PEIT-6) is blended with PBT (Celanex 1600) obtained from Hoechst Ticona(Summit, N.J.) and core shell elastomers E920 obtained from Kanake (Kanake Texas Corporation, Houston, Tex.). in a Leistritz extruder as in Example 5. The samples are injection molded and tested for mechanical properties using the same procedures outlined in Example 5. The compositions and the mechanical results are shown in Table 2.

TABLE 2

| Composition (wt %) | | Example 6 |
|---|---|---|
| PBT (Celanex 1600) (%) | | 60 |
| PEIT-6 (%) | | 20 |
| Kanake E920 (%) | | 20 |
| ASTM method | | |
| D638 | tensile modulus (MPSI) | 0.253 |
| D638 | ten. elong @ bk (%) | 230 |
| D638 | ten stress @ bk (ksi) | 4.7 |
| D638 | ten. elon @ yld (%) | 3.63 |
| D638 | ten. stress @ yld (ksi) | 5.36 |
| D790 | flex. mod (MPSI) | 0.29 |
| d790 | flex stress @ bk (ksi) | 0 |
| D790 | flex @ 5% strain (ksi) | 9.43 |
| D256 | Notched Izod (ft-lb) @ 20° C. | nb* |
| D256 | Notched Izod (ft-lb) @ −20 C. | 2.28 |
| D256 | Notched Izod (ft-lb) @ 40 C. | 1.42 |
| D648 | HDT (° C.) (264 psi) | 52 |
| D3763 | multiaxial impact load (lb) @ max. load 20° C. | 747 |
| D3763 | multiaxial impact load (lb) @ max. load −20° C. | 1112 |
| D3763 | multiaxial impact load (lb) @ max. load −40° C. | 1203 |

*nb: no break

Example 7

This example describes a blend of isosorbide containing polymers together with PBT and glass fiber. The glass fiber stiffens and increases the modulus of the blend. The polymer of example 1 (PEIT-6) is blended with PBT (Celanex 1600) obtained from Hoechst Ticona(Summit, N.J.) and glass fiber OCF 183(PPG, Pittsburgh, Pa.) in a Leistritz extruder as in example 5. The samples are injection molded and tested for mechanical properties using the same procedures outlined in example 5. The compositions and the mechanical results are shown in Table 3.

TABLE 3

| Composition (wt %) | | Example 7a | Example 7b |
|---|---|---|---|
| PBT celanex 1600 (%) | | 60 | 45 |
| PEIT-6 (%) | | 10 | 25 |
| Glass Fiber (OCF 183) (%) | | 30 | 30 |
| ASTM method | | | |
| D638 | tensile modulus (MPSI) | 1.31 | 1.32 |
| D638 | ten. elong @ bk (%) | 2.42 | 2.44 |
| D638 | ten stress @ bk (ksi) | 17.5 | 17.3 |
| D638 | ten. elon @ yld (%) | 0 | 0 |
| D638 | ten. stress @ yld (ksi) | 0 | 0 |
| D790 | flex. mod (MPSI) | 1.23 | 1.19 |
| d790 | flex stress @ bk (ksi) | 26.5 | 24.8 |
| D790 | flex @ 5% strain (ksi) | 0 | 0 |
| D256 | Notched Izod (ft-lb) @ 20° C. | 1.69 | 1.81 |
| D648 | HDT(° C.) (264 psi) | 90 | 87 |
| D3763 | multiaxial impact load (lb) @ max. load 20° C. | 275 | 292 |
| D3763 | multiaxial impact load (lb) @ max. load −20° C. | 311 | 306 |
| D3763 | multiaxial impact load (lb) @ max. load −40° C. | 285 | 315 |

It is to be understood that the above described embodiments are illustrative only and that modification throughout may occur to one skilled in the art. Accordingly, this invention is not to be regarded as limited to the embodiments disclosed herein.

What is claimed is:

1. A polymer blend comprising (1) a polyester comprising terephthaloyl moieties and, optionally, other aromatic diacid moieties; ethylene glycol moieties; diethylene glycol moieties wherein said diethylene glycol moieties are present in an amount of at least about 0.25 mole % of the polyester; isosorbide moieties, and, optionally, one or more other diol moieties, wherein said polyester has an inherent viscosity of at least about 0.35 dL/g when measured as a 1% (weight/volume) solution of said polyester in o-chlorophenol at a temperature of 25° C., and (2) another thermoplastic polymer.

2. The polymer blend according to claim 1, wherein said another thermoplastic polymer is selected from the group consisting of polycarbonates, styrene resins, alkyl acrylate resins, polyurethane resins, vinyl chloride polymers, polyarylethers, copolyetheresters, polyhydroxyethers, polarylates, and other polyesters.

3. The polymer blend according to claim 1, wherein said polyester comprises about 40% to about 50% terephthaloyl moieties and a total of up to about 10 mole % of one or more optional other aromatic diacid moieties.

4. The polymer blend according to claim 3, wherein said terephthaloyl moieties are derived from terephthalic acid or dimethyl terephthalate.

5. The polymer blend according to claim 3, wherein said ethylene glycol moieties are present in an amount of about 10 mole % to about 49.5 mole % of the polyester, said diethylene glycol moieties are present in the amount of about 0.25 mole % to about 10 mole % of the polyester, said isosorbide moieties are present in an amount of about 0.25 mole % to about 40 mole % of the polyester, and said one or more other diol moieties are present in an amount of up to about 15 mole % of the polyester.

6. The polymer blend according to claim 1, wherein said one or more other diol moieties are derived from aliphatic alkylene glycols or branched aliphatic glycols having from 3–12 carbon atoms and having the empirical formula HO—$C_nH_{2n}$—OH, where n is an integer from 3–12; cis or trans-1,4-cyclohexanedimethanol or mixtures thereof; triethylene glycol; 2,2-bis[4-(2-hydroxyethoxy)phenyl] propane; 1,1-bis[4-(2-hydroxyethoxy)-phenyl]cyclohexane; 9,9-bis[4-(2-hydroxyethoxy)phenyl]fluorene; 1,4:3,6-dianhydromannitol; 1,4:3,6-dianhydroiditol; or 1,4-anhydroerythritol.

7. The polyester blend according to claim 1, wherein said optional other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

8. The polyester blend according to claim 1, wherein terephthaloyl moieties are present in an amount of about 45 mole % to about 50 mole % of said polyester, said optional other aromatic diacid moieties are present in an amount up to about 5 mole % of said polyester, said ethylene glycol moieties are present in an amount of about 10 mole % to about 49.5 mole % of said polyester, said diethylene glycol moieties are present in an amount of about 0.25 mole % to about 5 mole % of said polyester, said isosorbide moieties are present in an amount of about 0.25 mole % to about 30 mole % of said polyester, and said other diol moieties are present in an amount of up to about 10 mole % of said polyester.

9. The polyester blend according to claim 8, wherein said other diol moieties are derived from cis-1,4-cyclohexanedimethanol, trans-1,4-cyclohexanedimethanol, or mixtures thereof.

10. The polyester blend according to claim 9, wherein said optional other aromatic diacid moieties are derived from isophthalic acid, 2,6-naphthalenedicarboxylic acid, 4,4'-bibenzoic acid, or mixtures thereof.

11. The polyester blend according to claim 1, wherein said polyester has an inherent viscosity of at least about 0.50 dL/g.

12. The polyester blend according to claim 10, wherein said polyester has an inherent viscosity of at least about 0.65 dL/g.

* * * * *